July 19, 1932. W. A. VOGEL 1,867,900
DECORATIVE OUTLINING
Filed April 28, 1927
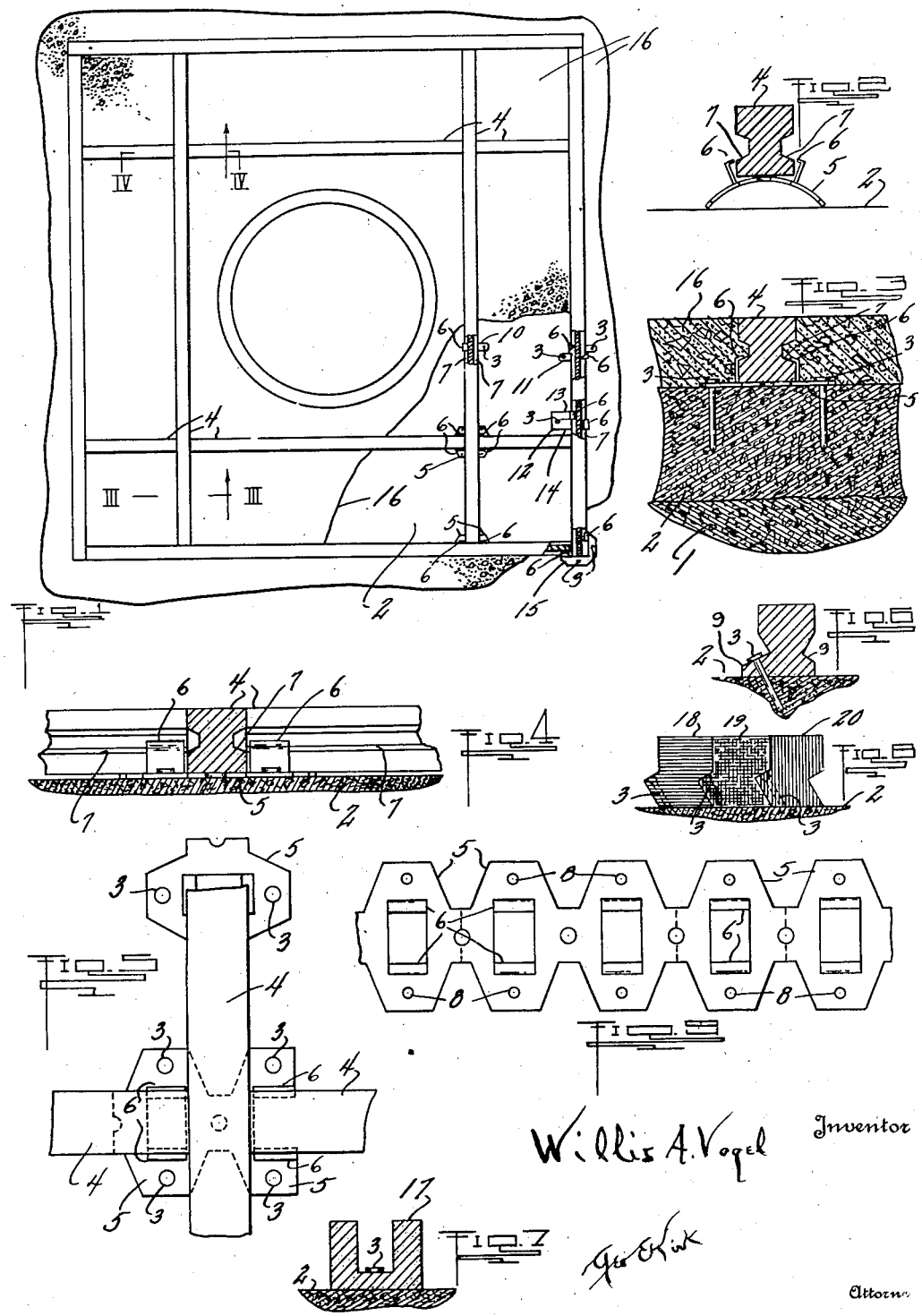

Patented July 19, 1932

1,867,900

UNITED STATES PATENT OFFICE

WILLIS A. VOGEL, OF TOLEDO, OHIO

DECORATIVE OUTLINING

Application filed April 28, 1927. Serial No. 187,276.

This invention relates to forming surface for plastic material.

This invention has utility when incorporated in leveling depth and decorative means as outlines, especially in terrazzo work.

Referring to the drawing:

Fig. 1 is a plan view, with parts broken away, showing an embodiment of the invention as adapted to floor designs of the terrazzo;

Fig. 2 is a view in section of a liner in position to have the clip coact in engaging position therewith;

Fig. 3 is a section on the line III—III, Fig. 1, showing the clip of Fig. 2 assembled with the liner;

Fig. 4 is a section on the line IV—IV, Fig. 1;

Fig. 5 is a fragmentary plan view of liners as intersecting with holding clips therefor;

Fig. 6 is a section of a liner with opposing seats of V-form instead of U-form; Fig. 7 is a channel liner; Fig. 8 is a laminated liner; and Fig. 9 is a plan view of a section of the clips in the form of a strip.

Primary support 1 may have built thereon subgrade coating or foundation 2, which in practice hereunder may be allowed to set sufficiently for workmen to operate thereon. With such a condition of set say for a cement or concrete, the material is preferably not so hard as to make difficult driving of nails 3 thereinto. Accordingly, liners 4 may be disposed in the approximate relations of design for decorative purposes as desired on this coating 2. With the liner 4 in position, clips 5 may be assembled therewith. These clips 5 are provided with overhangs 6 which may engage in opposing seats 7 of the strip 4. As so positioned, downward pressure on the upper surface of the strip 4 will flatten out this thin sheet metal clip 5 with the overhang 6 interfitting with the seats 7. In such position, nails 3 may be driven through openings 8 in the clip for anchoring the clip with the coating 2 thereby locating the strips 4 in the ornamental outline upon the coating 2 as desired. The subgrade establishing coating 2 is preferably of such height that the upper surface of the line 4 may approximate the desired finished height for the surface or floor.

In the type of clip 5, as shown, such may be supplied to the job in a continuous strip of some length either strung on a liner, or on a strip of wood or other material to give rigidity against bending or fracture, and to hold the overhang 6 from distortion. At line intersections, a pair of the clips 5 may be left assembled as a unit as shown in Fig. 5 so that the overhang 6 may engage oppositely extending liners as terminating in such seats with an intermediate liner 4 located between the termini of these two liners and abutted by adjacent ends of these overhangs 6. It is thus seen, a similar type of clip may be effective for lineal work, whether straight line or closed figure design, even with curves as well as straight lines, and further that such strips are susceptible of locating, in the desired relationship, intersecting direction liners.

The lines 4 may be used either side and the clip overhang still properly engage therewith. With liners having seats 9 (Fig. 6) there is preference to have the nailing ledge portion of these seats 9 on the lower region for thus more effectively locating the liner.

In some instances, variation from the type of clip may be desired, and to this end one direction holding clip 10 may be provided having a single overhang 6. Two direction clip 11 may be provided, oppositely extending, to have opposed overhangs 6. This clip 11 may be rocked as to the line of direction of the liner to bring such into position for anchoring the strip. Clip 12 is shown as having short limb 13 and long limb 14 for locating overhangs 6 in opposing relation. This type of clip would be distorted considerably when made of sheet metal for assembly with a strip, and accordingly is one which may be more conveniently placed with the strip by slipping on a terminus thereof.

Corner plate 15, as a clip, may have overhangs 6 for sustaining, in terminal formation, the liners at a right angle.

With these patterns laid out after the coating 2 has been formed by the liners 4 of a pre-set plastic material, say rubber composition, there is a definite outlining on the coating so that final cast 16 of the terrazo or plastic material may be made for anchoring with the subgrade coating 2 in the regions between the liners 4. With this cast 16 one thus assembling and anchoring at the seats 7 with the liners 4, there is a knitting together of these plastic materials in the desired design and the floor may be surfaced or dressed down from the approximately slightly overflush condition of the cast 16 to dress with the liners 4 in producing the finished floor.

There is in accordance herewith made possible, without detracting from the strength of the coating 2, and for accurate location thereon, independently of laying of the coating 2 interfering a layout for any desired ornamentation. This decorative liner setup accordingly is entirely above this subcoat. The anchoring thereof may be positive and definite by these metallic devices, away from working through to the normally exposed surface of the floor. This means that the resultant floor is of set plastic material not only as to the liners but as to the casts between the liners. The liners may be of a desired coloring and width for contributing to the decorative effect and independently of detracting from the durability or usefulness of the completed surface.

Primarily it will be seen that herein there is a formed strip having a metallic anchor whether directly through the clip or other fastening base forms, with supplemental holding means of the nail 3, or directly by nail 3 as shown in Fig. 6. In addition to this liner 16 as shown in Fig. 6, as a variation from the type of liner 4, there may be channel liner 17 of Fig. 7 to give a plurality of outlines in parallel, which may be similar or dissimilar in color. Again if the liners desired are to be laminated in different colors for decorative effect, this effect is obtained by liners 18, 19, 20, of Fig. 8. These liners of Figs. 6, 7, 8, as well as the liner 4 may be directly anchored by nails 3 instead of through the clips. It is desirable in mounting by nails to have such anchored with the coating 2 in a manner tending not to tilt or distort the liner.

What is claimed and it is desired to secure by Letters Patent is:

1. A cementitious material body having a finished cementitious material face, said body comprising a cementitious subcoat providing an intermediate cementitious material face, a clip resting on said intermediate face and having intermediate and lateral seats, driven anchoring means through said lateral seats and face and intermediate face entering into said subcoat to hold the clip against shifting relatively to the subcoat, and additional cementitious material having a finish receiving face and supported from the subcoat to extend beyond said clip, and a pre-set cementitious material seated in said clip intermediate seat and providing a finish face outline in the plane of said finish cementitious material face, said additional cementitious material being flowed to fully embed said anchoring means, fully embed said clip, and embed said pre-set cementitious material to approximate the finish face outline exposure only.

2. A cementitious material body having a finished cementitious material face, outline means in said face, a holding clip for said outline comprising a plate having a pair of hook-shaped portions overhanging toward each other to provide there-between an outline-means-engaging intermediate seat and additional lateral seats on opposite sides of said intermediate seat, and driven anchoring means for engaging said lateral seats in positioning the clip against shifting in holding the outline means as the cementitious material body effects embedding of the clip and approximates embedding of the outline means.

In witness whereof I affix my signature.
WILLIS A. VOGEL.